United States Patent

[11] 3,600,526

[72] Inventor Donald C. Pilkinton
Metuchen, N.J.

[21] Appl. No. 782,622
[22] Filed Dec. 10, 1968
[45] Patented Aug. 17, 1971

[73] Assignee Bell Telephone Laboratories, Incorporated
Murray Hill, Berkeley Heights, N.J.

[54] TIMED INSERTION BRIDGE
8 Claims, 2 Drawing Figs.

[52] U.S. Cl. 179/175.2 C, 179/18 FH, 179/1 MN
[51] Int. Cl. H04m 3/22
[50] Field of Search 179/1 MN, 5.5, 18.61, 27.12, 175.2 C

[56] References Cited

UNITED STATES PATENTS

| | | | |
|---|---|---|---|
| 2,855,469 | 10/1958 | White | 179/175.2 |
| 3,137,770 | 6/1964 | Doyle | 179/18 (.61) |
| 2,996,629 | 8/1961 | Rhodes | 328/97 X |

*Primary Examiner*—Kathleen H. Claffy
*Assistant Examiner*—Jan S. Black
*Attorneys*—R. J. Guenther and James Warren Falk

ABSTRACT: I disclose an arrangement for holding up a connection from the called end in a telephone switching system. Gradual insertion of holding bridges across the transmission paths of all switches serving a particular subscriber line eliminates acoustical disturbances. Responsive to a called subscriber signal, a bridge containing the emitter-collector path of a transistor is placed across the transmission paths by slowly biasing the transistor into conduction.

INVENTOR
BY D. C. PILKINTON
Charles H Davis
ATTORNEY

TIMED INSERTION BRIDGE

BACKGROUND OF THE INVENTION

This invention relates to inserting bridging elements across transmission paths in telephone systems and, more particularly, to arrangements for enabling the origins of calls to be traced.

In automatic telephone systems it is sometimes desirable to be able to maintain a connection to permit tracing a call to its origin. For example, subscribers may be annoyed, insulted, and even threatened by anonymous and often obscene calls, sometimes referred to as nuisance calls. Numerous arrangements have been devices in the prior art whereby such calls may be trapped, traced, and the calling line identified. Many of these arrangements require that the maintenance of the connection be done from the called end, since the calling line is not known.

In step-by-step telephone systems, a connection may be maintained despite the calling party going on-hook by keeping energized the calling party supervisory relay in the connector, simulating the receiver off-hook condition of the calling party. An example of an arrangement for performing such a function is disclosed in U.S. Pat. No. 3,137,770, entitled "Telephone Call Holding Arrangement," issued on June 16, 1964 to M.E. Doyle. However, a called customer's line is multipled to many connectors and each connector serves many customers. Since it is not initially known which connector is actually part of the connection to be maintained, the calling party supervisory relays in all of the connectors serving the customer whose called connections are to be maintained must be locked up. In the aforementioned Doyle patent, this is accomplished by a polarity sensitive bridge which is automatically inserted when the called party supervisory relay in the connector is energized, this relay reversing the battery across the line in response to the called party going off-hook. In other prior art arrangements, the called party may be equipped with a signaling device whereby a trace can be requested. In these arrangements, locking up the called party supervisory relay has been done by inserting holding bridges across the transmission paths of all the connectors through the closure of a relay contact when the called party requests calling line identification. In the latter type of arrangement, as a result of this sudden insertion of the bridges, acoustical disturbances, or "clicks" are heard in the talking paths. These clicks are undesirable, since innocent conversations may be taking place on others of the connectors which are bridged, and undue annoyance to telephone customers is to be avoided whenever possible

SUMMARY OF THE INVENTION

The present invention allows holding bridges to be inserted even in innocent talking paths because the insertion is accomplished without the creation of any acoustical disturbances. An illustrative embodiment of my invention is shown in a step-by-step telephone switching system equipped for manual tracing of intraoffice calls upon request by the called party.

In accordance with my invention, a device of variable conductivity is provided in series with each bridge to be inserted across a talking path. Each such device is connected to a timer which controls the rate of increase of the conductivity of the device, the device being initially in a nonconductive state. Each of these timers is actuated upon the called line requesting calling line identification. This actuation causes the timer to slowly increase the conductivity of the device, thereby inserting the bridge without creating any acoustical disturbances.

GENERAL DESCRIPTION

Figure 1:
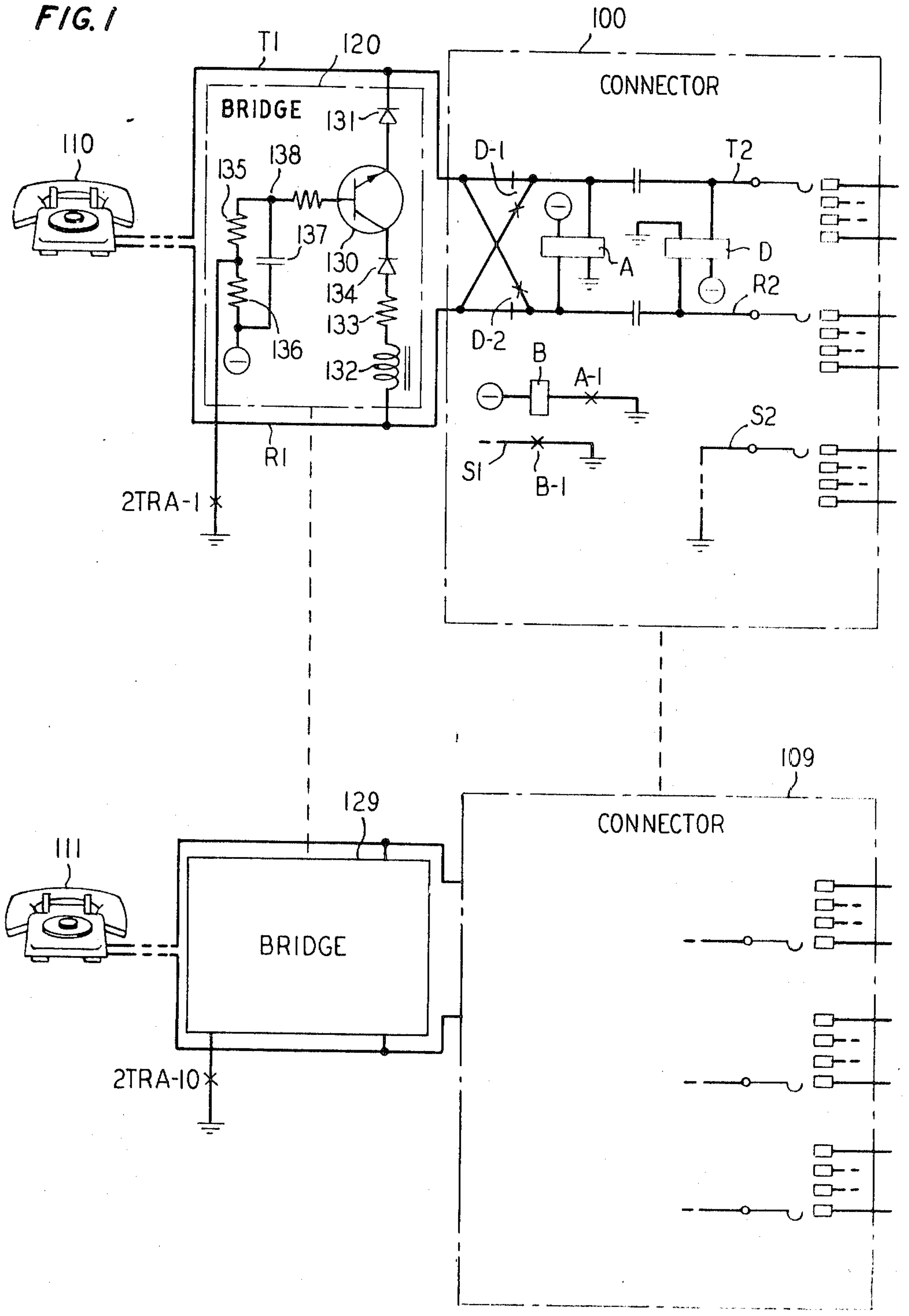
FIGS. 1 and 2, with FIG. 1 placed to the left of FIG. 2, depict an illustrative embodiment of the present invention in a step-by-step telephone switching system wherein a called party may request a manual trace upon receipt of a nuisance call.

The drawing shows the connections at the called end in a step-by-step telephone switching system. Station sets 200 and 201, FIG. 2, are representative of the station sets connected to connectors 100 through 109, FIG. 1. In such a system, each particular station set is connected to the same level on the output banks of all connectors. Station sets 110 and 111, FIG. 1, are shown as being the originators of calls to station sets 200 and 201, respectively, but only the portions of the connections necessary for an understanding of my invention have been shown.

Figure 2:
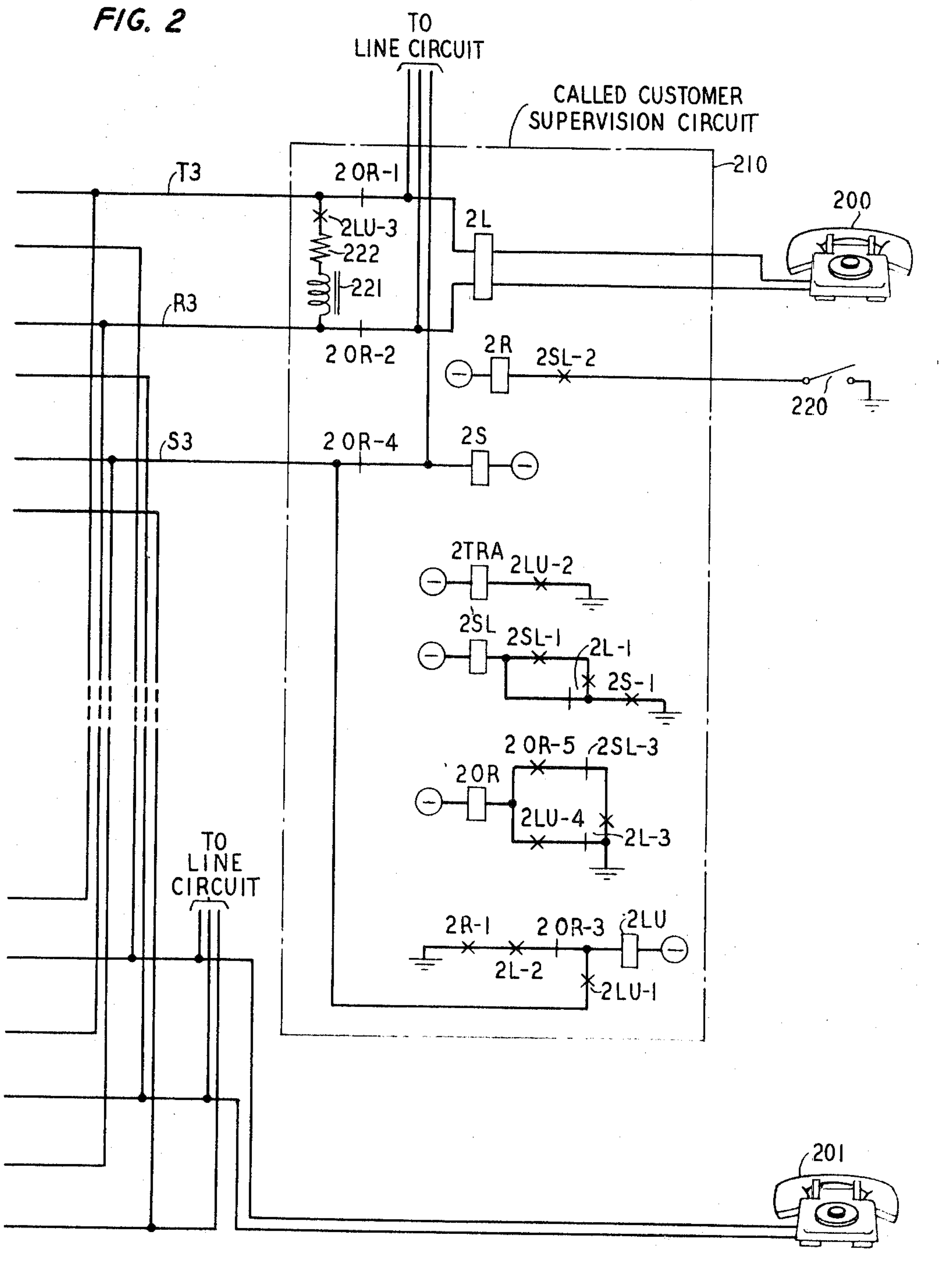

Assuming that the customer at station set 200 has been the recipient of annoying telephone calls, Called Customer Supervision Circuit 210, FIG. 2, is inserted in the line of station set 200 at the central office, and bridges 120 through 129, FIG. 1, are connected across the transmission paths of connectors 100 through 109, these connectors being all the connectors which serve station set 200.

One of the functions of circuit 210 is to distinguish between a call terminating at station set 200 and a call being originated by station set 200. If a call is originated by station set 200, circuit 210 performs no circuit operations with regard to maintaining the connection. However, if circuit 210 detects that a call is terminating at station set 200, circuit 210 is enabled to receive a calling line identification request from station set 200. Upon receipt of this request, circuit 210 actuates timers which cause bridges 120 through 129 to be gradually inserted across the transmission paths of connectors 100 through 109 without any acoustical disturbances. Thus, the parties conversing over connectors 100 through 109 are unaware of any bridging. When these bridges are inserted across the transmission paths of the connectors, the calling party supervisory relays in connectors 100 through 109 are held operated independent of any action taken by the calling customer. The continued operation of these relays maintains the sleeve control relays in an operated state, thereby grounding the sleeve leads going back toward the calling ends and keeping the connections locked up. Alarm circuits, no shown, are actuated in the central office to notify central office personnel that a manual trace is required. After the manual trace is completed, circuit 210 is released, by circuitry not shown and bridges 120 through 129 are removed from the transmission paths of connectors 100 through 109.

DETAILED DESCRIPTION

In the step-by-step system of the illustrative embodiment of the present invention, when a call is originated at station set 110 and terminated at station set 200, relay A in connector 100 is operated over the path from negative battery through the left-hand winding of relay A, normally closed contacts D–2, conductor R1 through the central office switching equipment (not shown), station set 110, conductor T1 through the central office switching equipment (not shown), normally closed contacts D–1, and the right-hand winding of relay A to ground. Relay B in connector 100 is then energized over an obvious path. This causes a ground to be placed on conductor S1, the sleeve lead, which maintains the connection from station set 110 up to connector 100 so long as relay A remains energized. A ground is also applied to conductor S2, and through the output bank of connector 100 to conductor S3, by circuitry, not shown, in connector 100, operating relay 2S in Called Customer Supervision Circuit 210.

When station set 200 goes off-hook in response to this call, relay D in connector 100 is operated over a path from negative battery through the right-hand winding of relay D, conductor T2, through the output bank of connector 100, conductor T3, normally closed contacts 20R–1, the upper winding of relay 2L, station set 200, the lower winding of relay 2L, normally closed contacts 20R–2, conductor R3, through the output bank of connector 100, conductor R2, and the left-hand winding of relay D to ground. This same path also causes relay 2L in Called Customer Supervision Circuit 210 to become energized.

As mentioned above, relay 2S has previously been operated. The operation of relay 2S prior to the operation of relay 2L signifies a call terminating at station set 200. This condition is recognized by the operation of relay 2SL in circuit 210, which operates responsive only to the aforementioned order of operation of relays 2S and 2L, as shown by the following description.

The operation of relay 2S before relay 2L allows relay 2SL to operate over a path from ground through make contacts 2S–1, normally closed contacts 2L–1, and the winding or relay 2SL to negative battery. The subsequent operation of relay 2L MAINTAINS RELAY 2SL operated over the path from ground through make contacts 2S–1, make contacts 2L–1, make contacts 2SL–1, and through the winding of relay 2SL to negative battery. If relay 2L had operated prior to relay 2S, the operation of relay 2SL would have been inhibited by normally open contacts 2SL–1.

Meanwhile, the subscriber at station set 200 has had the opportunity to determine whether or not this particular call is to be traced as a nuisance call. If he so decides, he sends a request signal to circuit 210. For the purposes of this illustrative embodiment, this request signal may be symbolized by the closing of manual switch 220 which allows relay 2R to operate over the path from ground through switch 220, make contacts 2SL–2, and through the winding or relay 2R to negative battery. It is understood that other types of signaling may be used, such as dialing a predetermined digit.

The operation of relay 2R allows relay 2LU to operate over the path from ground through make contacts 2R–1, make contacts 2L–2, normally closed contacts 20R–3, and through the winding of relay 2LU to negative battery. Relay 2LU is locked up to the ground applied to conductor S3 through make contacts 2LU–1. Relay 2TRA is then operated over an obvious path. The operation of relay 2TRA causes contacts 2TRA–1 through 2TRA–10 to apply ground to bridges 120 through 129, respectively. Closure of these contacts causes the gradual insertion of the bridges across the transmission paths of connectors 100 through 109 in the following manner.

Bridges 120 through 129 are identical and a description will only be given for bridge 120. Relay D having operated when station set 200 went off-hook, transistor 130 is in a nonconductive state with its base at the potential of negative battery and its emitter connected to negative battery through diode 131, conductor T1, make contacts D–2, and the left-hand winding of relay A in connector 100. Ground is connected to the collector of transistor 130 through the right-hand winding of relay A, make contacts D–1, conductor R1, inductor 132, resistor 133, and diode 134. When ground is applied to the junction of resistors 135 and 136 by the closure of contacts 2TRA–1, no immediate change occurs because it is well known in the art that the voltage across a capacitor cannot change instantaneously and the potential on both sides of capacitor 137 was originally negative battery. Capacitor 137 gradually charges through the path from ground through contacts 2TRA–1, resistor 135, and through capacitor 137 to negative battery. This results in the voltage at junction 138, and consequently at the base of transistor 130, gradually becoming more positive. The charging of capacitor 137 therefore slowly forward biases transistor 130, causing transistor 130 to conduct, thereby gradually lowering the impedance in series with inductor 132 and resistor 133 and inserting the bridge across the transmission path of connector 100. This simulates the receiver off-hook condition of station set 110 and maintains relay A in connector 100 operated, keeping the sleeve lead grounded to hold up the remainder of the connection.

The reader will recall that bridges 120 through 129 were simultaneously actuated by contacts 2TRA–1 through 2TRA–10 of relay 2TRA. In this illustrative embodiment, only connector 100 is involved in a nuisance call, it being understood that a nuisance call could be completed to station set 200 over any of connectors 100 through 109. The other connectors are not involved in nuisance calls, but the customers utilizing these connectors are not disturbed because no acoustical disturbances are introduced by the gradual insertion of the bridges.

Turning back to Called Customer Supervision Circuit 210, it can be seen that the operation of relay 2LU, through its make contacts 2LU–3, causes the bridge composed of inductor 211 and resistor 222 to be inserted across the called customer's line. This bridge, when inserted between conductors T3 and R3, simulates the receiver off-hook condition of the called line and causes relay D in connector 100 to be maintained in an operated state. The operation of relay D provides the proper polarity for bridge 120. Note that if relay D is not operated, the proper polarity is not maintained across diodes 131 and 134 in bridge 120 and therefore transistor 130 will not conduct. In this case, bridge 120 will not maintain relay A operated.

The subscriber at station set 200 may now go on-hook without fear of releasing the connection. Furthermore, he may go off-hook and originate another telephone call, as follows.

When the subscriber at station set 200 goes on-hook, relay 2L releases. Relay 20R then operates over the path from ground through normally closed contacts 2L–3, make contacts 2LU–4, and through the winding of relay 20R to negative battery. Station set 200 is then cut off from connector 100 due to break contacts 20R–1 and 20R–2. The opening of break contacts 20R–4 in response to the operation of relay 20R removes relay 2S from the control of the ground of conductor S3 and relay 2S releases. Consequently, relay 2SL releases when make contacts 2S–1 in its path to ground open upon the release of relay 2S. If the subscriber at station set 200 now goes off-hook in order to originate a call, relay 2L is again operated, but this time in series with the line relay in the line circuit, not shown. Relay 20R remains operated over the path from ground through make contacts 2L–3, normally closed contacts 2SL–3, make contacts 20R–5, and through the winding of relay 20R to negative battery.

As long as relay 2LU remains energized, relay 2TRA is energized and bridges 120 through 129 remain across each of the connectors 100 through 109 that has its D relay energized. After completing the manual trace of the nuisance call, central office personnel will then release relay 2LU from control of the ground applied to conductor S3. This will cause relay 2TRA to release and remove the ground from bridges 120 through 129, thereby turning off the transistors in the bridges and opening up the bridges. Circuit 210 is now restored to normal.

Accordingly, I have shown an arrangement whereby bridges may be gradually inserted across transmission circuits without creating any acoustical disturbances in the talking paths.

It is understood that the above-described arrangement is merely illustrative of the application of the principles of this invention. Numerous other arrangements may be devised by those skilled in the art without departing from the spirit and scope of my invention.

What I claim is:

1. TIn an arrangement for trapping telephone calls to a predetermined station in a step-by-step telephone switching system wherein a holding bridge is inserted across the transmission path of a connector serving said predetermined station upon receipt of a trap request signal from said station, the improvement comprising a transistor having its collector-to-emitter path serially connected to said bridge, and a timing network connected to the base of said transistor responsive to said trap request signal for applying a changing voltage to said base over a predetermined timed interval whereby said transistor is forward biased over said interval.

2. In an arrangement for identifying the source of calls to a predetermined station in a communications system, apparatus for inserting a holding bridge in a transmission circuit without creating acoustical disturbances comprising means at said station for transmitting an identification request signal, a bridge of controllable conductivity including a transistor having its collector-to-emitter path connected to said transmission circuit, timer means for increasing said conductivity from a predetermined minumum value to a predetermined maximum value including means coupled to the base of said transistor for biasing said transistor, and starting means responsive to the receipt of a call by said station and said request signal for actuating said timer means.

3. The apparatus of claim 2 wherein said starting means comprises a really energizable in response to said request signal after said station has answered a call, and said timer means also comprises means responsive to the energization of said relay for actuating said biasing means.

4. The apparatus of claim 3 wherein said biasing means includes a capacitor coupled to the base of said transistor and means for charging said capacitor.

5. In an arrangement for identifying the source of calls to a predetermined station in a communications system, apparatus for inserting a holding bridge in a transmission circuit without creating acoustical disturbances comprising means at said station for transmitting an identification request signal, a bridge of controllable conductivity connected to said transmission circuit including a transistor, an inductor, and a unidirectional current carrying device, said transistor having its collector-to-emitter path serially connected to said inductor and said unidirectional current carrying device, timer means for increasing said conductivity from a predetermined minimum value to a predetermined maximum value, and starting means responsive to the receipt of a call by said station and said request signal for actuating said timer means.

6. The apparatus of claim 5 wherein said timer means includes a capacitor coupled to the base of said transistor and charging means responsive to said starting means for charging said capacitor.

7. The apparatus of claim 6 wherein said starting means includes a first relay operative in response to said station going off-hook during a terminating call to said station, a second relay operative in response to the operation of said first relay and the transmission of said request signal, and actuating means responsive to the operation of said second relay for actuating said charging means.

8. The apparatus of claim 7 further comprising means responsive to said actuating means for simulating an off-hook condition of said station and means responsive to said station going on-hook during a terminating call to said station for removing said station from sad transmission circuit and allowing said station to originate a call.